US008344623B2

(12) United States Patent
Hare

(10) Patent No.: US 8,344,623 B2
(45) Date of Patent: Jan. 1, 2013

(54) LAMP FIXTURE EMPLOYING SEMICONDUCTOR LIGHT SOURCES AS A SUBSTITUTE FOR A SEALED BEAM LAMP

(75) Inventor: Ronald G. Hare, Belleville (CA)

(73) Assignee: Magna International Inc., Ontario (CA)

( * ) Notice: Subject to any disclaimer, the term of this patent is extended or adjusted under 35 U.S.C. 154(b) by 660 days.

(21) Appl. No.: 12/502,398

(22) Filed: Jul. 14, 2009

(65) Prior Publication Data

US 2010/0013366 A1 Jan. 21, 2010

Related U.S. Application Data

(60) Provisional application No. 61/135,022, filed on Jul. 16, 2008.

(51) Int. Cl.
*B60Q 1/00* (2006.01)

(52) U.S. Cl. .......................................................... 313/547

(58) Field of Classification Search .................. 362/507, 362/547
See application file for complete search history.

(56) References Cited

U.S. PATENT DOCUMENTS

| | | | | |
|---|---|---|---|---|
| D572,856 | S | 7/2008 | Kehl et al. | |
| D586,486 | S | 2/2009 | DiPenti et al. | |
| 2004/0202007 | A1* | 10/2004 | Yagi et al. | 362/545 |
| 2007/0025117 | A1* | 2/2007 | Watanabe et al. | 362/545 |

* cited by examiner

*Primary Examiner* — Anh T. Mai
*Assistant Examiner* — Andrew Coughlin
(74) *Attorney, Agent, or Firm* — Warn Partners, P.C.

(57) ABSTRACT

A novel lamp fixture which employs semiconductor light sources and which is designed to replace or otherwise substitute for a conventional sealed beam incandescent or gas discharge fixture. Preferably, the semiconductor light sources are arranged in a combination of sub-assemblies, each of which is constructed to provide either spread light illumination or high intensity illumination for a desired illumination pattern.

32 Claims, 3 Drawing Sheets

LAMP FIXTURE EMPLOYING SEMICONDUCTOR LIGHT SOURCES AS A SUBSTITUTE FOR A SEALED BEAM LAMP

CROSS-REFERENCE TO RELATED APPLICATIONS

This application claims the benefit of U.S. Provisional Application No. 61/135,022, filed Jul. 16, 2008. The disclosure of the above application is incorporated herein by reference.

FIELD OF THE INVENTION

The present invention relates to a lamp fixture for vehicle lighting systems which employs semiconductor light sources. More specifically, the present invention relates to a lamp fixture which employs semiconductor light sources, where the lamp fixture is used as a substitute or replacement for a conventional sealed beam lamp.

BACKGROUND OF THE INVENTION

Light emitting semiconductors, such as high output light emitting diodes (LEDs), produce white light at sufficient levels so that semiconductor light sources are a suitable replacement for incandescent or gas discharge lamps to create lighting systems such as vehicular headlamps, or other light fixtures.

Such semiconductor light sources are used to construct headlamps or other fixtures which have a much longer expected operating lifetime, and which are more energy efficient, compared to headlamps employing incandescent or gas discharge light sources.

While much work has been done in the area of vehicular headlamp systems employing high output semiconductor light sources, to date the resulting designs have resulted in custom lamp fixtures which require the design or modification of the vehicle in which they are to be installed.

As is known, one of the drawbacks of using semiconductor light sources is that waste heat must be removed from operating semiconductor light sources to prevent failure and/or shortened operating lifetimes of the semiconductor junctions. Accordingly, much of the design of known lamp fixtures employing semiconductor light sources is concerned with the ability to remove such waste heat from the semiconductor light sources.

In vehicles designed for conventional incandescent or gas discharge light fixtures, the lamp fixture is typically received in a receptacle which provides little or no airflow, or other heat rejection capability, to the rear of the lamp fixture. Thus, any lamp fixture employing semiconductor light sources which is intended to replace a conventional incandescent or gas discharge light fixture must be carefully designed to provide adequate heat rejection capacity despite being installed in the conventional receptacle.

Accordingly, there exists a need to have a vehicular lighting fixture which employs semiconductor light sources, such as high output light emitting diodes, to produce desired illumination patterns for headlamps or the like which can be installed and/or retrofitted in conventional receptacles on vehicles.

SUMMARY OF THE INVENTION

It is an object of the present invention to provide a novel lamp fixture employing semiconductor light sources which obviates or mitigates at least one disadvantage of the prior art.

According to a first aspect of the present invention, there is provided a lamp fixture to produce from semiconductor light sources at least one desired illumination pattern comprising spread light illumination and high intensity illumination. The lamp fixture replaces or substitutes for a conventional lamp fixture employing incandescent or gas discharge light sources. The lamp fixture includes at least two light element sub-assemblies, each employing semiconductor light sources to produce desired illumination, with at least one of the at least two light element sub-assemblies producing illumination in a spread pattern and at least another of the at least two light element sub-assemblies producing illumination in a high intensity pattern.

The lamp fixture also includes a power supply operable to convert power supplied to the lamp fixture from a supplied voltage to a voltage required by the at least two light element sub-assemblies, and a main body including electrical connectors and mounting features corresponding to the conventional lamp fixture, each of the at least two light element sub-assemblies and the power supply being mounted to the main body, and the main body operating to transfer heat produced in the at least two light element sub-assemblies and the power supply to the surrounding atmosphere.

Preferably, the lamp fixture includes sufficient light element sub assemblies to selectably produce illumination in at least two different illumination patterns.

The present invention provides a novel lamp fixture which employs semiconductor light sources and which is designed to replace or otherwise substitute for a conventional sealed beam incandescent or gas discharge fixture. Preferably, the semiconductor light sources are arranged in a combination of sub-assemblies, each of which is constructed to provide either spread light illumination or high intensity illumination for a desired illumination pattern.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
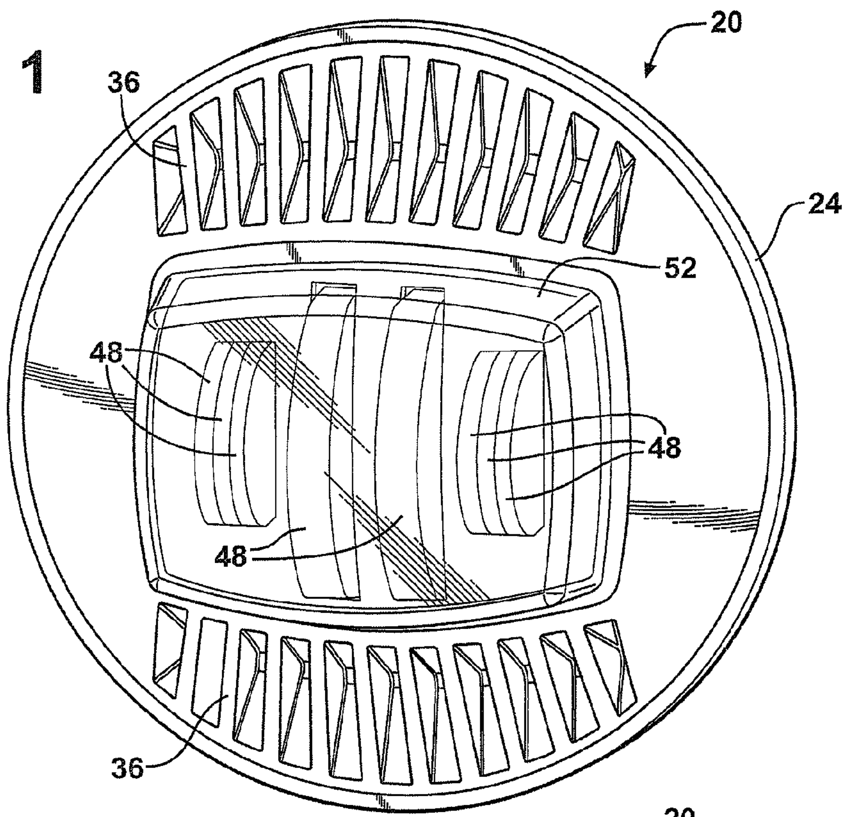
FIG. 1 is a front perspective view of a lamp fixture in accordance with the present invention.
Figure 2:
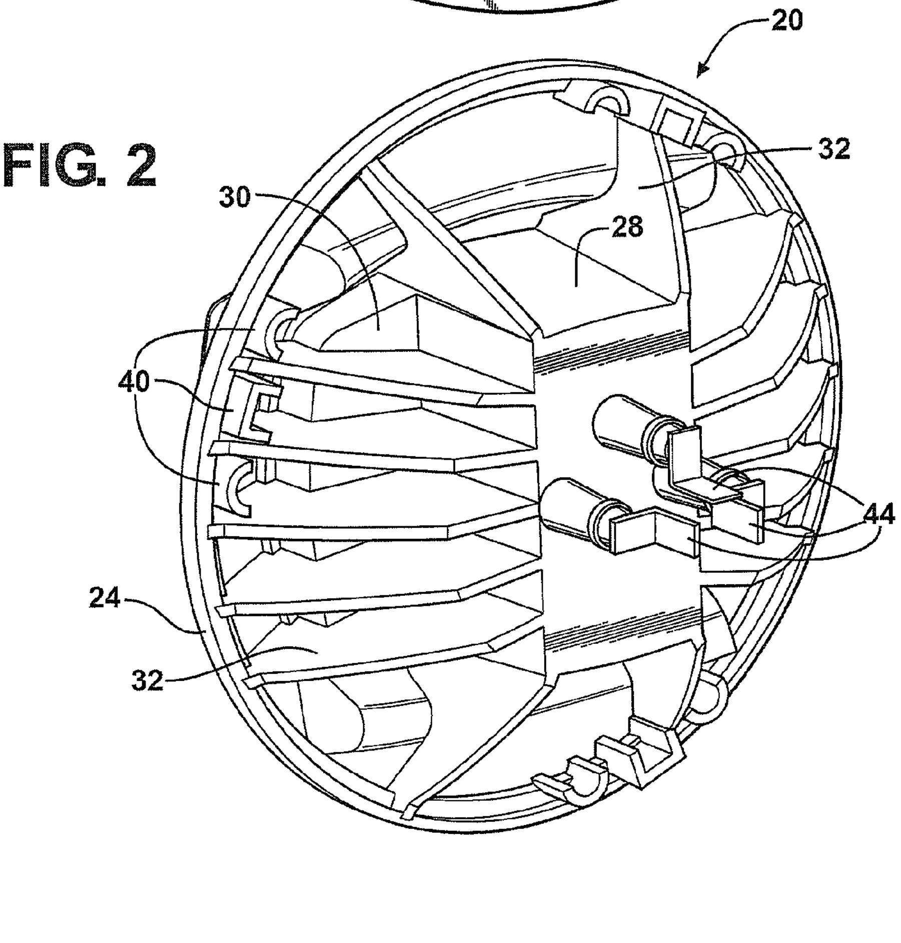
FIG. 2 is a rear perspective view of the lamp fixture shown in F*igure* 1.

A vehicular lamp fixture in accordance with the present invention is indicated generally at 20 in FIGS. 1 and 2. In the illustrated embodiment, fixture 20 is shown as being a round fixture, such as a PAR56 2D1 (seven inch diameter) fixture, and operates to produce both high beam and low beam illumination patterns.

However, as will be apparent to those of skill in the art, the present invention is not limited to this configuration, and it is intended that the present invention is also able to be employed in other standard fixture configurations, such as rectangular fixtures, larger or smaller diameter round fixtures and/or fixtures which only produce low beam, high beam or other desired beam patterns and/or in custom fixture configurations to meet specific vehicle designer criteria. Many existing automotive sealed beams are referenced in FMVSS-108 (Federal Motor Vehicle Safety Standard 108) with type numbers 1A1, 2A1, 2B1, 1C1, 2C1, 2D1, 2E1, UF, and LF, and are described in detail in SAE J2595.

Fixture 20 includes a main body 24 which, amongst other functions, supports the other components of lamp fixture 20. Main body 24 is also designed to assist and facilitate the removal of waste heat from the semiconductor light sources of fixture 20. In the illustrated embodiment, main body 24 is fabricated from a material, such as aluminum, which facilitates the transfer of heat as described below.

As best seen in FIG. 2, main body 24 includes a centrally located recess 28 within which the power electronics (described below) are mounted, and the semiconductor light sources (also described below) are also operable to be mounted in recess 28 and/or to a planar area 30 of main body 24. A set of heat transfer members 32, in the form of ribs or other suitable structures such as heat pipes (not shown), assist in the transfer of heat away from recess 28 and planar area 30 to the front face of main body 24 which, in normal use, is exposed to airflow past fixture 20 and is thus better able to transfer waste heat to the atmosphere than is the rear side of main body 24.

As best seen in FIG. 1, the front face of main body 24 preferably further includes one or more sets of cooling features 36, such as upstanding ribs or fins to assist in the transfer of waste heat to the surrounding atmosphere. As will be apparent to those of skill in the art, the particular design of cooling features 36 is not particularly limited and may be any suitable structure or design, as desired by the vehicle designer, which provides an increased surface area to facilitate heat transfer from main body 24 to the surrounding air.

As mentioned above, it is presently preferred that main body 24 be fabricated from die-cast aluminum or the like. However, it is also contemplated that main body 24 can be formed of other materials, such as zinc alloys, etc. It is further contemplated that main body may be formed of suitable injection molded plastic materials and, in such a case, the desired heat transfer properties for main body 24 are provided by heat transfer members 32, which are in the form of metallic inserts molded into main body 24 etc., the cooling features 36 may be molded into the main body 24 as well.

Main body 24 is also designed to allow for the substitution of fixture 20 for a conventional incandescent or gas discharge lamp fixture. Thus, the mounting and alignment structures 40 of the conventional lamp fixture are provided on main body 24 to allow fixture 20 to be mounted in the conventional receptacle.

Similarly, the electrical connectors 44 used to provide power to fixture 20 corresponds to the electrical connectors of the conventional lamp fixture that fixture 20 is designed to substitute for. Thus, the number, size, spacing, configuration and location of electrical connectors 44 on main body 24 are compatible, if not identical, to the electrical connectors of the conventional lamp fixture that fixture 20 is designed to substitute for.

Fixture 20 employs one or more sets of semiconductor light source sub-assemblies 48 to produce the desired light patterns. In the present preferred embodiment, sub-assemblies 48 are semiconductor light source elements such as those described in U.S. Provisional Patent Application 60/897,352 filed Jan. 25, 2007 and in PCT Application PCT/CA2008/000139, filed Jan. 25, 2008, each of which is assigned to the assignee of the present application and the contents of which are incorporated herein by reference. As is known to those of skill in the art, required headlamp illumination patterns comprise spread light, which illuminates a defined area, and high intensity light, which provides increased levels of illumination at specific locations within the area illuminated by the spread light. The semiconductor light source elements described in the Provisional Patent Application 60/897,352 mentioned above can be arranged to provide spread light illumination patterns or high intensity illumination patterns, as required to form a desired illumination pattern.

Each sub-assembly 48 is mounted to main body 24 within recess 28 and/or on planar area 30 such that waste heat from the sub-assemblies 48 is transferred to main body 24 and/or to heat transfer members 32. Preferably, a bezel 52 is mounted to the front of main body 24 to form a weather proof enclosure, with main body 24, about sub-assemblies 48.

A power supply (not shown) is mounted within recess 28 and is electrically connected between electrical connectors 44 and sub-assemblies 48. This power supply functions to convert the voltage applied to fixture 20 at electrical connectors 44 to the voltage required by sub-assemblies 48. It is contemplated that, in many cases, the voltage used by the conventional lamp fixture (which fixture 20 is designed to substitute for) is not the voltage required by sub-assemblies 48. The power supply is intended to appropriately convert these voltages, as necessary. The selected design of the power supply is not particularly limited and a variety of suitable designs, as will occur to those of skill in the art may be employed.

Figure 3:
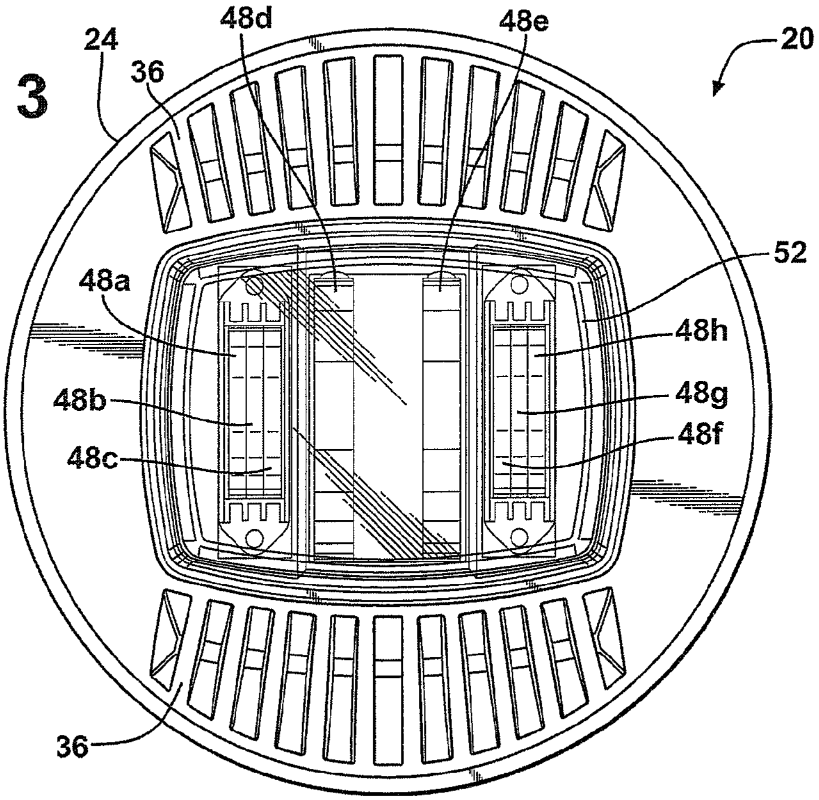
FIG. 3 is a front view of the lamp fixture shown in FIG. 1.

Referring now to FIG. 3, in the specific design illustrated a total of eight sub-assemblies 48 are employed to produce the desired illumination patterns. Four sub-assemblies 48, specifically sub-assemblies **48*a*, 48*c*, 48*f* and 48*h*, provide the necessary spread light for a low beam illumination pattern. Sub-assembly 48*d*** provides the necessary high intensity light to complete the desired low beam illumination pattern.

To form a desired high beam pattern, sub-assemblies **48*b* and 48*g* are also illuminated to provide the necessary high beam spread light and sub-assembly 48*e*** is illuminated to provide the necessary high beam high intensity light.

As will be apparent to those of skill in the art, depending upon the illumination levels provided by sub-assemblies 48 and/or regulatory requirements for headlamp (or other) illumination patterns, different numbers of sub-assemblies 48 may be employed.

Figure 4:
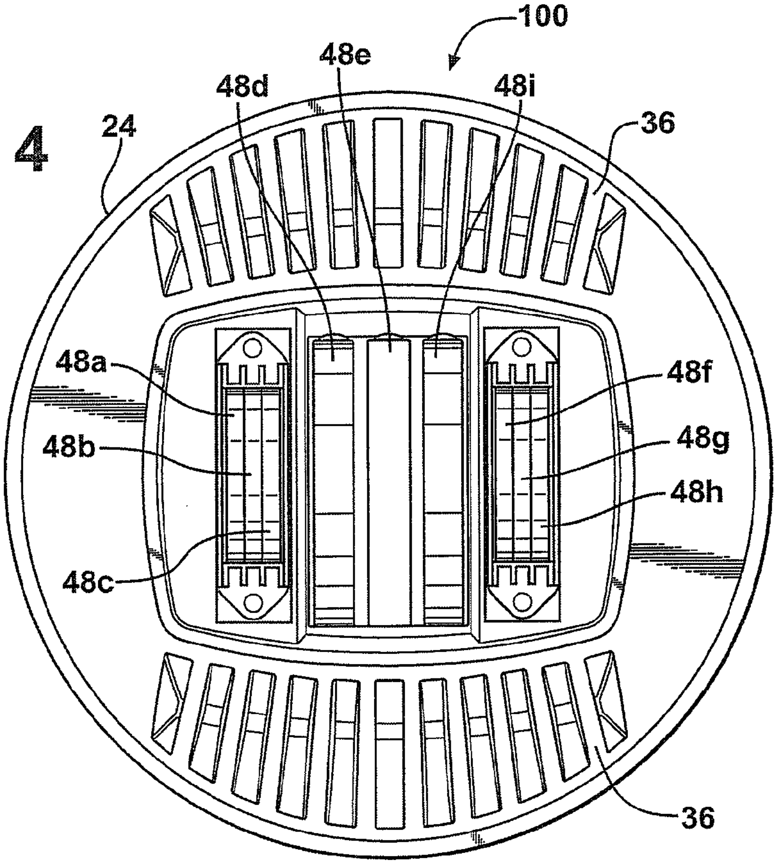
FIG. 4 is a front view of another embodiment of a lamp fixture in accordance with the present invention.

FIG. 4 shows an example of a lamp fixture 100, which is similar to fixture 20 and wherein like components to those shown in FIGS. 1, 2 and 3 are indicated with like reference numerals. In fixture 100, where bezel 52 has been removed for clarity, an additional sub-assembly 48i is included to provide additional high intensity light to form the desired low beam illumination pattern.

Figure 5:
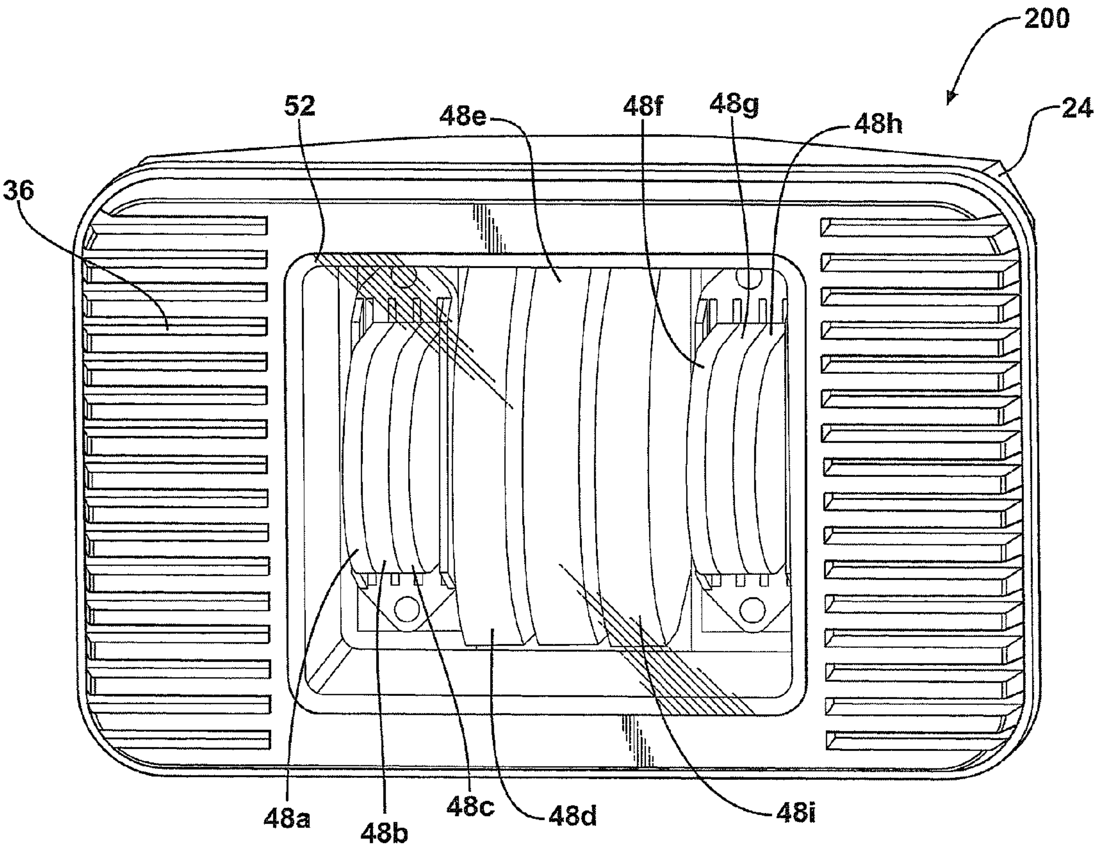
FIG. 5 is a front perspective view of yet another embodiment of a lamp fixture in accordance with the present invention.

In FIG. 5, another example of a light fixture in accordance with the present invention is indicated generally at 200 and like components to those shown in FIGS. 1, 2, 3 and 4 are indicated with like reference numerals. As shown, fixture 200 is rectangular in shape and is operable for use as a substitute and/or replacement for a conventional rectangular incandescent or gas discharge headlamp.

The present invention provides a lamp fixture which employs semiconductor light sources and which is designed to replace or otherwise substitute for a conventional sealed beam incandescent or gas discharge fixture. Preferably, the semiconductor light sources are arranged in a combination of sub-assemblies, each of which is constructed to provide either spread light illumination or high intensity illumination for a desired illumination pattern.

The above-described embodiments of the invention are intended to be examples of the present invention and alterations and modifications may be effected thereto, by those of skill in the art, without departing from the scope of the invention which is defined solely by the claims appended hereto.

I claim:

1. A lamp fixture to produce from semiconductor light sources at least one desired illumination pattern having spread light illumination and high intensity illumination, the lamp fixtures operable for replacing a conventional lamp fixture, the lamp fixture comprising:

at least two light element sub-assemblies each employing semiconductor light sources coupled to an optical body to produce desired illumination, a first of said at least two light element sub-assemblies producing illumination in a low beam illumination pattern, and a second of said at least two light element sub-assemblies producing illumination in a high beam illumination pattern;

a power supply coupled to said at least two light element sub-assemblies to selectively convert power supplied to said lamp fixture from a supplied voltage to a voltage required by said at least two light element sub-assemblies;

a main body including electrical connectors and mounting features corresponding to said conventional lamp fixture, each of said at least two light element sub-assemblies and said power supply being mounted to said main body, and said main body configured to transfer heat produced in said at least two light element sub-assemblies and said power supply directly to the surrounding atmosphere across the front exterior of the lamp fixture; and said optical body of said first of said at least two light element sub-assemblies and said optical body of said second of said at least two light element sub-assemblies are parallel to one another and mounted vertically to said main body within a centrally located recess formed as part of said main body.

2. The lamp fixture of claim 1, said first of said at least two light element sub-assemblies being operable to provide a spread portion of said low beam illumination pattern.

3. The lamp fixture of claim 1, said first of said at least two light element sub-assemblies being operable to provide a high intensity portion of said low beam illumination pattern.

4. The lamp fixture of claim 1, said second of said at least two light element sub-assemblies being operable to provide a spread portion of said high beam illumination pattern.

5. The lamp fixture of claim 1, said second of said at least two light element sub-assemblies being operable to provide a high intensity portion of said high beam illumination pattern.

6. The lamp fixture of claim 1, further comprising a plurality of electrical connectors operable for providing power to said lamp fixture, said power supply being operable for providing electrical communication between said plurality of electrical connectors and said at least two light element sub-assemblies.

7. The lamp fixture of claim 1, further comprising:

a planar area;

said centrally located recess formed as part of said main body in proximity to said planar area, each of said at least two light element sub-assemblies being mounted in said centrally located recess.

8. The lamp fixture of claim 1, further comprising a bezel mounted to said main body to form a weatherproof enclosure about said at least two light element sub-assemblies.

9. The lamp fixture of claim 1, wherein said main body is made of a material being one selected from the group consisting of aluminum, zinc alloys, and injection molded materials.

10. The lamp fixture of claim 1, said main body further comprising a plurality of heat transfer members exposed to air flow and formed on a rear face of said main body, operable for removing of waste heat from said lamp fixture.

11. The lamp fixture of claim 10, said plurality of heat transfer members further comprising a plurality of heat transfer pipes operable for transferring heat away from said main body.

12. The lamp fixture of claim 10, said plurality of heat transfer members further comprising a plurality of ribs operable for transferring heat away from said main body.

13. The lamp fixture of claim 1, said main body further comprising a plurality of cooling features operable for removing of waste heat from said lamp fixture exterior exposed to airflow past said lamp fixture.

14. The lamp fixture of claim 13, said plurality of cooling features further comprising a plurality of ribs formed on a front face of said main body, wherein said main body is made of aluminum and waste heat is conducted to said front face through said main body.

15. The lamp fixture of claim 13, said plurality of cooling features further comprising a plurality of fins formed on a front face of said main body.

16. A lamp fixture operable for producing at least one desired illumination pattern, comprising:

at least two light element sub-assemblies;

a plurality of semiconductor light sources coupled to optical bodies, a first portion of said plurality of semiconductor light sources operable as part of a first of said at least two light element sub-assemblies for producing a low beam illumination pattern, and a second portion of said plurality of semiconductor light sources operable as part of a second of said at least two light element sub-assemblies for producing a high beam illumination pattern and coupled, said optical body of said first of said at least two light element sub-assemblies and said optical body of said second of said at least two light element sub-assemblies are parallel to one another and mounted vertically to said main body within a centrally located recess formed as part of said main body;

a main body having a plurality of heat transfer members formed as part of said main body comprising a plurality of ribs, and a plurality of cooling features formed as part of said main body on a front face of said main body on the exterior of said lamp fixture exposed to airflow across said lamp fixture, said at least two light element sub- assemblies mounted to said main body;

said plurality of ribs comprising substantially vertical ribs and parallel horizontal ribs extending within a centrally located recess formed as part of said main body.

17. The lamp fixture operable for producing at least one desired illumination pattern of claim 16, further comprising one or more of said first portion of said plurality of semiconductor light sources of said first of said at least two light element sub-assemblies being operable for producing a spread portion of said low beam illumination pattern.

18. The lamp fixture operable for producing at least one desired illumination pattern of claim 16, further comprising one or more said first portion of said plurality of semiconductor light sources of said first of said at least two light element sub-assemblies being operable for producing a high intensity portion of said low beam illumination pattern.

19. The lamp fixture operable for producing at least one desired illumination pattern of claim 16, further comprising one or more of said second portion of said plurality of semiconductor light sources of said second of said at least two light element sub-assemblies being operable for producing a spread portion of said high beam illumination pattern.

20. The lamp fixture operable for producing at least one desired illumination pattern of claim 16, further comprising one or more of said second portion of said plurality of semiconductor light sources of said second of said at least two light element sub-assemblies being operable for producing a high intensity portion of said high beam illumination pattern.

21. The lamp fixture operable for producing at least one desired illumination pattern of claim 16, further comprising:

a plurality of electrical connectors operable for providing power to said lamp fixture; and a power supply operable for placing said at least two light element sub-assemblies in electrical communication with said plurality of electrical connectors, said power supply being operable to convert voltage received by said electrical connectors to the voltage required by said at least two light element sub-assemblies.

22. The lamp fixture operable for producing at least one desired illumination pattern of claim 16, said main body further comprising:

a planar area;

a plurality of mounting features formed as part of said main body in proximity to said planar area, said plurality of mounting features operable for placing said lamp fixture in connection with a vehicle; and said centrally located recess formed as part of said main body in proximity to said planar area, each of said at least two light element sub-assemblies being mounted in said centrally located recess.

23. The lamp fixture operable for producing at least one desired illumination pattern of claim 16, further comprising a bezel mounted to said main body to form a weatherproof enclosure about said at least two light element sub-assemblies.

24. The lamp fixture operable for producing at least one desired illumination pattern of claim 16, wherein said main body is made of a material being one selected from the group consisting of aluminum, zinc alloys, and injection molded materials.

25. The lamp fixture operable for producing at least one desired illumination pattern of claim 16, said plurality of heat transfer members exposed to air flow and formed on a rear face of said main body, facilitating the removal of waste heat from said lamp fixture.

26. The lamp fixture operable for producing at least one desired illumination pattern of claim 16, said plurality of cooling features further comprising a plurality of ribs formed on said front face of said main body, and facilitating the removal of waste heat from said lamp fixture to the surrounding atmosphere across the front exterior of the lamp fixture.

27. The lamp fixture operable for producing at least one desired illumination pattern of claim 16, said plurality of cooling features further comprising a plurality of fins formed on said front face of said main body, and facilitating the removal of waste heat from said lamp fixture to the surrounding atmosphere across the front exterior of the lamp fixture.

28. A lamp fixture operable for producing at least one desired illumination pattern, comprising:

a first light element sub assembly;

a first group of semiconductor light sources operable as part of said first light element sub-assembly for producing a spread portion of a low beam illumination pattern, and a high intensity portion of said low beam illumination pattern;

a second light element sub-assembly;

a second group of semiconductor light sources operable as part of said second light element sub-assembly for producing a spread portion of a high beam illumination pattern, and a high intensity portion of said high beam illumination pattern;

a main body, said first light element sub-assembly being mounted on said main body, said second light element sub-assembly being mounted on said main body;

a bezel mounted to a front of said main body to form a weatherproof enclosure about said first light element sub-assembly and said second light element sub-assembly;

a plurality of heat transfer members formed as part of a rear face of said main body operable for facilitating the removal of waste heat from said lamp fixture;

a plurality of cooling features formed as part of a front face of said main body on opposing sides of said bezel operable for facilitating the removal of waste heat from said lamp fixture;

a plurality of electrical connectors mounted on said main body and operable for providing power to said lamp fixture; and a power supply coupled to said at least two light element sub-assemblies in electrical communication with said electrical connectors to selectively convert voltage received by said electrical connectors to the voltage required by said first light element sub-assembly and said second light element sub-assembly.

29. The lamp fixture operable for producing at least one desired illumination pattern of claim 28, said main body further comprising:

a planar area;

a plurality of mounting features operable for connection said lamp fixture to a vehicle, said plurality of mounting features formed as part of said main body in proximity to said planar area; and a centrally located recess formed as part of said main body in proximity to said planar area, said first light element sub-assembly and said second light element sub-assembly being mounted in said centrally located recess.

30. The lamp fixture operable for producing at least one desired illumination pattern of claim 28, wherein said main body is made of a material being one selected from the group consisting of aluminum, zinc alloys, and injection molded materials.

31. The lamp fixture operable for producing at least one desired illumination pattern of claim 28, said plurality of heat transfer members being one selected from the group consisting of a plurality of ribs exposed to air flow and a plurality of heat transfer pipes exposed to air flow.

32. The lamp fixture operable for producing at least one desired illumination pattern of claim 28, said plurality of cooling features being one selected from the group consisting of a plurality of ribs and a plurality of fins.

* * * * *